April 6, 1954

H. MENNECKE 2,674,454

MEANS OR MECHANISM FOR MAINTAINING
A FILM STRIP UPON A FILM SPROCKET

Filed July 7, 1949

INVENTOR.
Harold Mennecke
BY Clarence E. Threlfy
His Attorney.

Patented Apr. 6, 1954

2,674,454

UNITED STATES PATENT OFFICE 2,674,454

MEANS OR MECHANISM FOR MAINTAINING A FILM STRIP UPON A FILM SPROCKET

Harold Mennecke, Chicago, Ill., assignor to De Vry Corporation, a corporation of Illinois Application July 7, 1949, Serial No. 103,442

1 Claim. (Cl. 271—2.3)

This invention relates to certain new and useful improvements in a means or mechanism for maintaining a film strip upon a film sprocket.

Among the several objects of this invention is the provision of a means or mechanism for maintaining a film strip upon a film sprocket in a manner such that the retainer plate of such means or mechanism may be quickly moved into and out of film retaining position with respect to the sprocket without damage to the film strip.

Another and equally important object of the invention is the provision of a simplified and improved construction of a means or mechanism for maintaining a film upon its sprocket.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
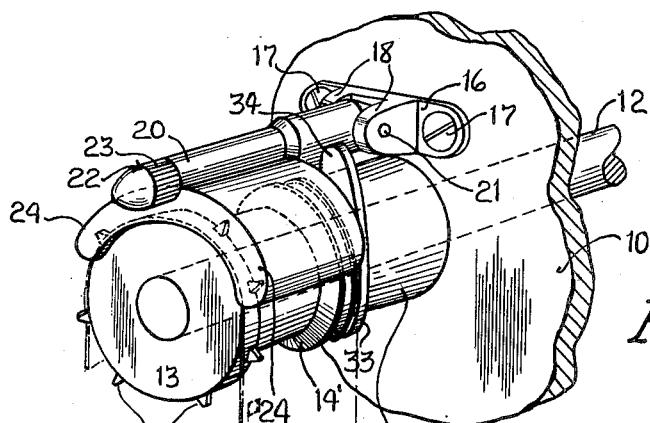
Fig. 1 is a perspective view of the invention in film retaining position with respect to a sprocket.

The several objects of my invention are accomplished by the preferred form of construction shown in the accompanying drawings, in which drawings 10 indicates a wall of a motion picture projecting apparatus with which my invention is associated. Formed as a part of this wall 10 is a boss 11 through which is journaled a driven shaft 12. On this shaft 12 is mounted a sprocket 13 having the usual sprocket teeth 14 which are adapted to engage the perforations of a film strip 15.

My improved and simplified film retaining means or mechanism comprises a bracket 16 secured to the wall 10 by suitable bolts 17.

This bracket 16 provides spaced lugs 18. Between these lugs 18 is positioned the shank 19 of an arm 20. The shank 19 is pivotally connected to the lugs 18 by means of pintles 21.

The outer end of the arm 20 provides a finger button 22 having a knurled surface 23 to afford proper finger gripping of the arm 20 to pivot the arm 20 about its pivot pins 21. Extending from opposite sides of the arm 20 and preferably though not necessarily formed as an integral part thereof are aprons 24 curving to conform to the configuration of the sprocket wheel 13 and provided with undercut grooves 25 for the reception of the teeth 14 and guiding ribs 14' of the sprocket wheel 13.

Figure 2:
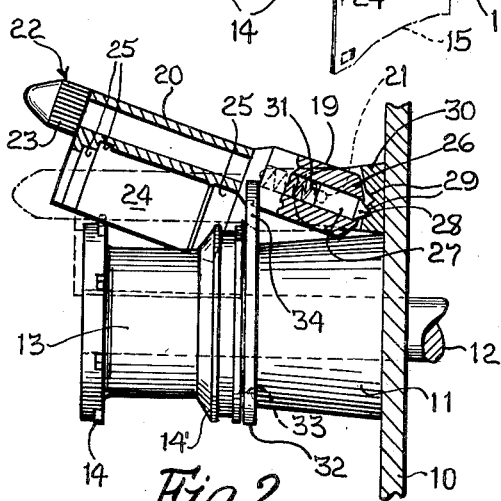
Fig. 2 is a side part-sectional detail view of the same showing the invention disposed in a non-operative position with respect to the sprocket.
Figure 3:
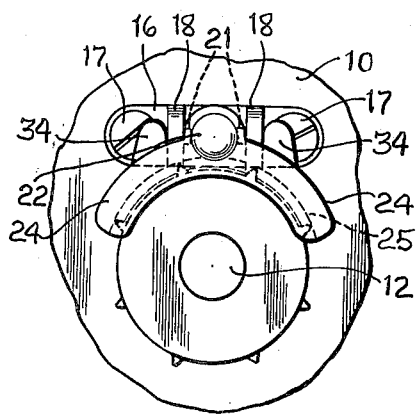
Fig. 3 is a front elevational view of the same.
Figure 4:
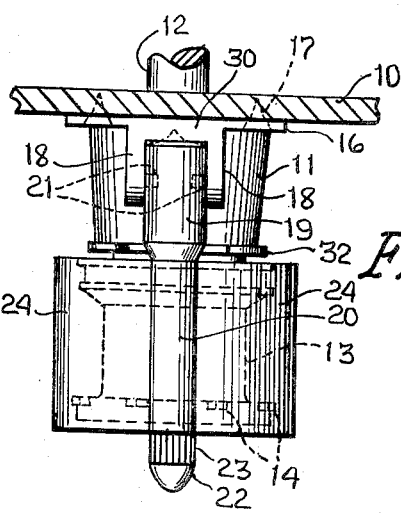
Fig. 4 is a plan view of the same.

The shank 19 provides a socket 26. Mounted in this socket 26 is a latch pin 27 having a latch head 28 adapted to engage either of two latch notches 29 formed in the back wall 30 of the bracket 16 whereby to releasably latch the arm 20 in either of its two positions as shown in Figs. 1 and 2.

The latch head 28 and the latch notches 29 are of corresponding shape so that mere pressure upon the outer end of the arm 20 will automatically disengage the latch pin 27 from the latch notches. The latch pin 27 is yieldably projected in its outermost position by means of a spring 31 mounted in the socket 26 and bearing against the latch pin 27 as shown.

To complete the invention I provide a guard plate 32. This guard plate 32 is mounted upon a reduced portion 33 of the boss 11. Such a guard plate 32 provides upwardly extending fingers 34 disposed on opposite sides of the shank 19. The arrangement is such that when the film strip is projected between the sprocket 13 and the aprons 24, the fingers 34 will prevent the edges of the film strip from being positioned beneath the shank 19, where such edge portion would be ruptured upon pivotal movement of the arm 20 to dispose the aprons 24 into film retaining position. Such aprons 24 together constitute a retaining plate for the film strip.

From the foregoing description it is apparent that I have provided a means or mechanism for retaining a film upon the sprocket 13 which may be quickly and conveniently moved into and from film retaining position without damage or injury to the film strip. The construction disclosed is of a simplified and improved nature of film retaining heretofore employed.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

The combination comprising a bracket adapted for attachment to a wall of an associated machine, means for connecting said bracket to said wall, said bracket provided with spaced apart laterally extending supporting arms, an arm extending laterally in the same direction as said arms and having an enlarged shank at one end thereof adjacent said bracket and a finger gripping portion at the other end thereof, means for pivotally connecting the shank to said bracket between said arms, a retainer plate carried by said arm for positioning upon a film sprocket of said machine over a film strip disposed upon said sprocket, said bracket having a base portion between said arms and opposite the pivotal connection between the shank and said bracket being provided with spaced vertically aligned notches having tapered top and bottom walls, said shank having a socket formed in one end thereof adjacent said bracket and extending in a longitudinal direction with respect thereto, and a spring-urged tapered end detent in said socket and engageable with one of the corresponding tapered notches of said base when said retainer plate is positioned upon said film strip and engageable with the other of the notches when said plate is positioned from engagement with said strip.

References Cited in the file of this patent

UNITED STATES PATENTS

| Number | Name | Date |
|---|---|---|
| 920,531 | Bradley | May 4, 1909 |
| 1,764,939 | Dina | June 17, 1930 |
| 1,966,857 | Goldhammer | July 17, 1934 |
| 2,228,092 | Sperry | Jan. 7, 1941 |
| 2,235,029 | Levinson | Mar. 18, 1941 |
| 2,422,310 | Nemeth | June 17, 1947 |
| 2,455,051 | Fairbanks | Nov. 30, 1948 |

FOREIGN PATENTS

| Number | Country | Date |
|---|---|---|
| 847,998 | France | Oct. 19, 1939 |